United States Patent
Kiemlen et al.

(10) Patent No.: US 10,487,707 B2
(45) Date of Patent: Nov. 26, 2019

(54) FLUID SUPPLY SYSTEM

(71) Applicant: Mahle International GmbH, Stuttgart (DE)

(72) Inventors: Ralf Kiemlen, Reutlingen (DE); Josef Rutha, Rudersberg (DE); Kai-Torsten Schmiedl, Altdorf (DE); Michael Steinhoff, Ludwigsburg (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 16/098,790

(22) PCT Filed: Apr. 13, 2017

(86) PCT No.: PCT/EP2017/058998
§ 371 (c)(1),
(2) Date: Nov. 2, 2018

(87) PCT Pub. No.: WO2017/190937
PCT Pub. Date: Nov. 9, 2017

(65) Prior Publication Data
US 2019/0128154 A1 May 2, 2019

(30) Foreign Application Priority Data
May 3, 2016 (DE) .......... 10 2016 207 653

(51) Int. Cl.
*F01M 5/00* (2006.01)
*F01M 1/16* (2006.01)
(Continued)

(52) U.S. Cl.
CPC ............. *F01M 5/007* (2013.01); *F01M 1/10* (2013.01); *F01M 1/16* (2013.01); *F01M 11/03* (2013.01);
(Continued)

(58) Field of Classification Search
CPC . F01M 5/007; F01M 1/10; F01M 1/16; F16H 57/0434; F16N 29/02
(Continued)

(56) References Cited

U.S. PATENT DOCUMENTS

| | | | |
|---|---|---|---|
| 6,742,716 B1 * | 6/2004 | Duprez | F01P 7/167 236/34.5 |
| 2012/0240893 A1 * | 9/2012 | Hoji | F01M 1/16 123/196 R |

(Continued)

FOREIGN PATENT DOCUMENTS

| | | |
|---|---|---|
| DE | 1120212 B | 12/1961 |
| DE | 19902408 A1 | 8/2000 |

(Continued)

OTHER PUBLICATIONS

English abstract for FR-2655702.
English abstract for DE-19943294.
English abstract for DE-19902408.

*Primary Examiner* — William E Dondero
*Assistant Examiner* — Mark K Buse
(74) *Attorney, Agent, or Firm* — Fishman Stewart PLLC

(57) ABSTRACT

A fluid supply system with a component includes a first bypass valve arranged in a control channel with a valve body adjustable at least between a first and a second position. The valve body separates the control channel into a first and a second space and has a leakage opening connecting the first space to the second space. The second space is connected to a fluid reservoir via a leakage channel, and a switchable valve is arranged in the leakage channel. A sensing device is configured to sense a property of the fluid and convey the property to a controlling device that is configured to close the valve to block the leakage channel when a predefined (Continued)

property is reached. A second bypass valve is configured to reduce a transient oscillation of the first bypass valve during a starting of the system.

20 Claims, 3 Drawing Sheets

(51) Int. Cl.
*F16H 57/04* (2010.01)
*F01M 1/10* (2006.01)
*F16N 29/02* (2006.01)
*F01M 11/03* (2006.01)
*F16K 1/34* (2006.01)

(52) U.S. Cl.
CPC ........... *F16H 57/0434* (2013.01); *F16K 1/34* (2013.01); *F16N 29/02* (2013.01); *F01M 2005/008* (2013.01); *F16N 2200/10* (2013.01)

(58) Field of Classification Search
USPC ........................................................ 184/6.12
See application file for complete search history.

(56) References Cited

U.S. PATENT DOCUMENTS

| | | | |
|---|---|---|---|
| 2017/0051644 A1* | 2/2017 | Lagerlof | F01M 5/005 |
| 2018/0017155 A1* | 1/2018 | Gooden | F01M 5/002 |
| 2018/0355771 A1* | 12/2018 | Ruffet | F01M 1/10 |

FOREIGN PATENT DOCUMENTS

| | | |
|---|---|---|
| DE | 19943294 A1 | 3/2001 |
| EP | 2511490 A1 | 10/2012 |
| FR | 2655702 A1 | 6/1991 |
| WO | 2015172792 A1 | 11/2015 |

* cited by examiner though the cooler, for example the oil cooler, only on reaching the predefined temperature. Hereby also in the cold state a sufficient lubrication is to be achieved, for example of an internal combustion engine or of bearing sites.

FLUID SUPPLY SYSTEM

CROSS-REFERENCE TO RELATED APPLICATION

This application claims priority to German Patent Application No. DE 10 2016 207 653.1, filed on May 3, 2016, and International Patent Application No. PCT/EP2017/058998, filed on Apr. 13, 2017, both of which are hereby incorporated by reference in their entirety.

TECHNICAL FIELD

The present invention relates to a fluid supply system with a component. The invention relates furthermore to an internal combustion engine with at least one such fluid supply system.

BACKGROUND

From DE 199 43 294 A1 fluid supply system of an internal combustion engine is known, with a filter device and with a cooler able to be engaged into the fluid circuit in a temperature-dependent manner upstream of this filter device. In a lower and an upper temperature range, at least a predominant volume flow flows through the cooler here, whereas in a medium temperature range lying therebetween at most a non-predominant volume flow flows through the cooler. Hereby, the temperature of the fluid is to be able to be adapted optimally to operating conditions of the internal combustion engine.

From DE 199 02 408 A1 an automatic transmission for vehicles with a hydrodynamic converter is known, which is supplied with oil by an oil pressure pump via a main pressure value, wherein a converter safety valve delimits the oil pressure before the converter and a lubricating oil line branches off from the oil inlet line of the converter, which lubricating oil line contains a lubricating valve and wherein in addition an oil cooler is provided. This oil cooler is arranged in an oil line between the main pressure valve and the branch of the lubricating oil line and has a bypass, the throughflow of which is controlled or respectively regulated.

From WO 2015/172792 A1 is a fluid supply system with a component and with a first bypass valve arranged in a control channel with a valve body which is adjustable at least between a first and a second position. The valve body can separate the control channel here into a first and second space and has a leakage opening, which connects the first space with the second space. The second space is connected with a fluid reservoir via a leakage channel, wherein the leakage channel has a switchable valve for the at least partial closing of the leakage channel and wherein at least one sensing device is provided, which senses a property of the fluid and conveys it to a controlling device, which in turn is configured such that it closes the valve when a predefined property is reached, and thereby blocks the leakage channel.

Further fluid supply systems are also known from U.S. Pat. No. 6,742,716 B1 and from EP 2 511 490 A1.

Fluid supply systems in internal combustion engines, for example oil filter modules, are usually equipped with a cooler, in order to protect the fluid, in particular the oil, from damage due to too high temperatures during operation. In the cold state, however, the pressure loss of the cold fluid increases owing to the changed flow properties, for which reason usually a first bypass valve equipped with an expansion element is provided, which on falling below or respectively for reaching a predefined temperature directs a fluid flow past the cooler, and directs the fluid flow through the cooler, for example the oil cooler, only on reaching the predefined temperature. Hereby also in the cold state a sufficient lubrication is to be achieved, for example of an internal combustion engine or of bearing sites.

A generic fluid supply system controls, for example, the oil flow as a function of one or more operating parameters, which are detected via a sensor. Here, directly on starting of the internal combustion engine a bypass is produced around the cooler or around the filter element, in order to be able to always supply the internal combustion engine with lubricating oil. When the internal combustion engine is at a standstill, however, the risk exists of the fluid supply system draining through a leakage opening, which during starting of the internal combustion engine leads to the valve initially not being controlled according to the actual operating data, but rather must first have "transient oscillation".

SUMMARY

The present invention is therefore concerned with the problem of indicating an improved fluid supply system with a bypass circuit, which is configured in particular in a structurally simple, favourably-priced manner, and which in addition is distinguished by an improved starting behaviour.

This problem is solved according to the invention by the subject matter of the independent claim 1. Advantageous embodiments are the subject matter of the dependent claims.

The present invention is based on the general idea of providing a second bypass valve, which is designed in such a way that a transient oscillation of the first bypass valve during starting of the system is at least reduced, preferably is even prevented, by a second space, situated downstream of the first bypass valve, being filled more quickly on starting of an internal combustion engine, and thereby the first bypass valve is adjusted properly more quickly. At the same time, a switchable valve, in particular a solenoid valve, is now used for a bypass circuit, but owing to its comparatively small working stroke, this is not used directly for switching a valve body of the first bypass valve, but rather for opening or respectively closing a leakage channel, which influences the pressure conditions necessary for switching the valve body of the first bypass valve. By means of the valve provided according to the invention, therefore no adjusting of the valve body itself is brought about, but rather only an influencing of the pressure conditions, which lead to the rapid adjusting of the valve body of the first bypass valve. The fluid supply system according to the invention has here a component, for example a filter device for filtering the fluid, or a cooler for cooling the fluid, and a bypass channel bypassing this component. In a control channel, the first bypass valve is arranged here with the valve body, which is adjustable at least between a first and a second position, and which in the first position blocks off a fluid inflow to the component and in the second position blocks off a fluid flow through the bypass channel, or vice versa. Between the two positions, of course intermediate positions are also possible here, in which a partial fluid flow flows to the component and a partial fluid flow flows through the bypass channel. The valve body of the first bypass valve separates the control channel here into a first and a second space and has a leakage opening, which connects the first space with the second space. In the second space a spring element is arranged, which prestresses the valve body preferably into its second position, wherein the second space is connected with a fluid reservoir via a leakage channel. In this leakage channel, the switchable valve according to the invention, in particular the solenoid valve, is provided, by means of which the leakage channel can be opened or respectively closed. A sensing device is also provided, which detects a property, for example a temperature, of the fluid and conveys it to a controlling device, which in turn is configured in such a manner that it closes the valve on reaching a predefined temperature and thereby blocks the leakage channel. The sensing device and the controlling device can of course also be combined here in an expansion element. With the fluid supply system according to the invention therefore a rapidly switching first bypass valve can be created in a structurally simple and favourably-priced manner, the switching movement of which depends exclusively on the elastic force of the spring element, the position of the valve and the pressure of the fluid in the first and second space. Compared to a first bypass valve which is switchable via an expansion element, the valve can switch comparatively quickly here even for the case where it is not configured as a solenoid valve, but rather has an expansion element, since it has only a very small valve stroke, and thereby quickly influence the pressure conditions prevailing in the second space, whereby in turn owing to the pressure difference prevailing for example between the first and the second space and the elastic force, a rapid switching of the valve body and thereby of the first bypass valve are possible. It is of great advantage here that for blocking the leakage channel an already very small valve stroke of the valve is sufficient, which can be brought about by such a valve, because the leakage channel has a very small cross-section compared to the control channel. Through the second bypass valve, in addition, during a starting of the internal combustion engine, a second space, situated downstream of the first bypass valve, can fill more quickly than would be possible in the case of a drained system exclusively via the leakage opening, whereby no transient oscillation of the valve body of the first bypass valve occurs, but rather a proper operation occurs quickly.

According to the invention, the second bypass valve is arranged in the leakage opening of the valve body. For prevention of the transient oscillation of the first bypass valve or respectively its valve body during starting of the internal combustion engine after a drained system, the arrangement site of the second bypass valve is immaterial in so far as it enables a rapid filling of the second space during starting of the internal combustion engine.

The second bypass valve is arranged in the leakage opening of the valve body and has a spring-loaded valve body, which is prestressed with a sealing element tightly against an edge of the leakage opening as a valve seat and which has a throttle opening which is smaller than the leakage opening. This offers the great advantage that the second bypass valve can be realized exclusively by a modification of the valve body of the first bypass valve, without further alterations being necessary, whereby a structurally simple and favourably-priced production are possible.

Not according to the invention, alternatively thereto, it is also conceivable that the second bypass valve is arranged in the region of the valve, wherein the second bypass valve has for example a spring-prestressed cylinder-like valve body, which has openings on the shell side and an opening on the face side. In this case, the second bypass valve has, furthermore, an expansion element and a plunger coupled therewith, which on exceeding of a predefined property of the fluid, for example on exceeding of a predefined temperature, closes the face-side opening and thereby blocks the leakage channel. The spring-prestressed cylinder-like valve body is prestressed here against a valve seat and is configured in such a manner that it rises from the valve seat in a pressure-dependent manner and thereby opens the second bypass valve. Hereby, in particular in the case of a drained fluid supply system and with a starting internal combustion engine, a rapid filling of the second space can be achieved, and a rapid engaging of a proper operation can be realized.

In the same way, this also occurs in an alternative embodiment, in which the second bypass valve has a spring-prestressed cylinder-like valve body with an annular shoulder, and which is configured such that in a pressure-dependent manner it frees a balancing channel connecting the second space with the control channel, and thereby opens the second bypass valve.

In an advantageous further development of the solution according to the invention, the fluid supply system is configured as a lubricant supply system, in particular as an oil supply system. Particularly in the case of oil filter modules, owing to the viscosity of the oil in the cold state, a passing thereof through an oil cooler is categorically to be avoided, for which reason the first bypass valve according to the invention can be used here in an advantageous manner in order to bring about a rapid and effective lubrication, for example of the internal combustion engine or of other bearing sites, both in cold and also in warm state.

In a further advantageous embodiment of the solution according to the invention, the sensing device is configured as a temperature sensing device, and the controlling device is configured such that it closes the valve on reaching the temperature of T≥117° C. At a temperature of T≤117° C., on the other hand, the valve remains open, whereby a leakage flow flows to the fluid reservoir, in particular to the oil reservoir, and through the pressure difference between the first and the second space in the control channel the valve body of the first bypass valve is pressed into its first position, contrary to the elastic force. On reaching the predefined temperature of 117° C., the valve closes off the leakage channel, so that no further fluid outflow can take place via it into the fluid reservoir. After the blocking off of the leakage channel, the pressure rises in the second space, until the latter reaches the pressure in the first space, whereupon only the elastic force of the spring element is responsible for the adjustment of the valve body. The two pressures in the first and second space cancel out in this case. Owing to the elastic force of the spring element, the valve body of the first bypass valve is adjusted into its second position, in which the bypass channel is closed to the bypass and the fluid channel is opened to the component. In this state, the fluid flow is therefore directed via the component.

In a further advantageous embodiment of the solution according to the invention, the valve body is configured as a valve piston which has a shell-side first opening to the bypass channel and a shell-side second opening to the component. This represents merely a possible embodiment of the valve body according to the invention, which, however, can be produced in a comparatively simple and favourably-priced manner and, at the same time, makes possible the pressure conditions in the first and second space in a comparatively simple manner. For this, for example, the leakage opening is arranged in the crown of the valve piston.

In an advantageous further development of the solution according to the invention, the valve piston or the valve body itself is made from metal or from plastic, wherein a construction from metal enables a particularly high durability also with respect to aggressive fluids. By comparison, through a construction of the valve piston/valve body from plastic, a comparatively favourably-priced production can be achieved.

In an advantageous further development of the solution according to the invention, the valve has a solenoid valve, an electric switch, a bimetal and/or an expansion element or is constructed as such. Particularly the embodiment as a solenoid valve, as bimetal or as electric switch enables a comparatively rapid switching and thereby a rapid reaction.

Expediently, the component can be configured as a cooler, gear or filter device. This non-conclusive list already suggests what varied possibilities of use exist for the fluid supply system according to the invention, in particular in an internal combustion engine. Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown here, respectively diagrammatically.

DETAILED DESCRIPTION

Figure 1:
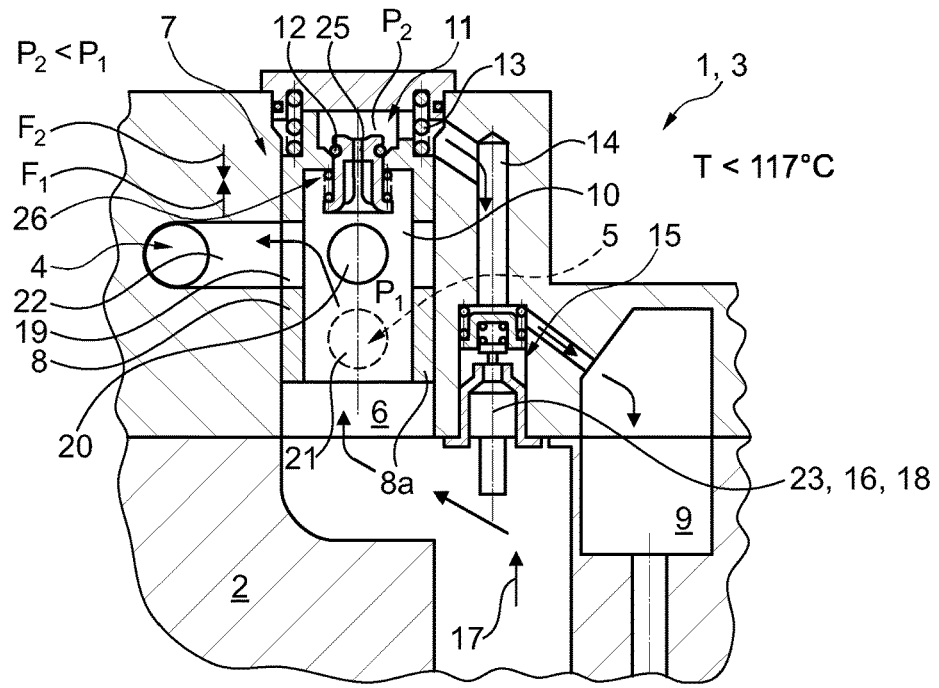
FIG. 1 illustrates a fluid supply system according to the invention with a fluid property below a predefined property, having a second bypass valve integrated into the first bypass valve.
Figure 2:
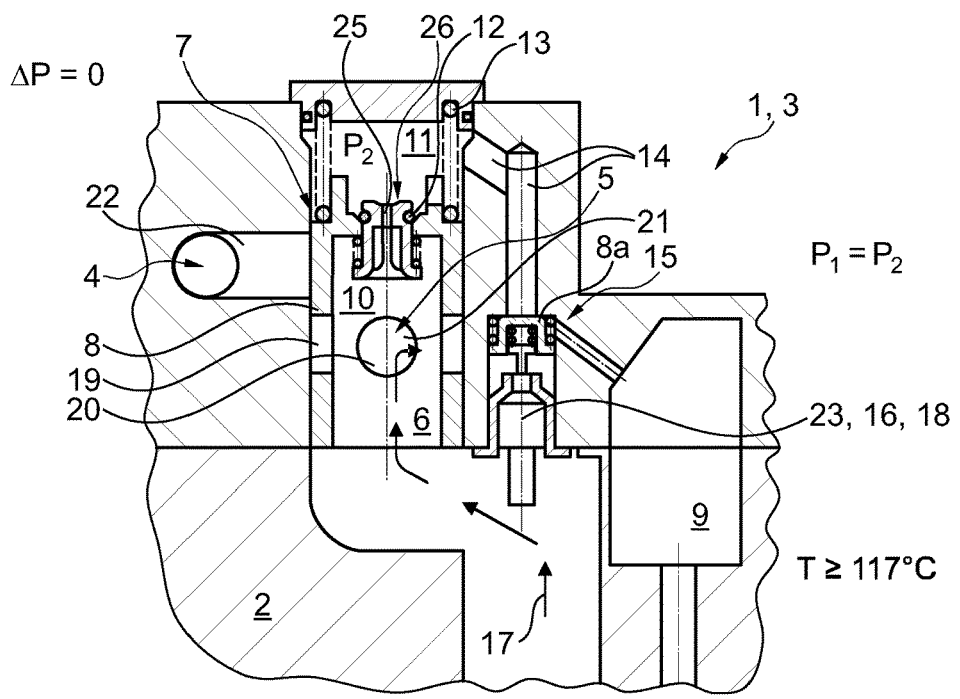
FIG. 2 illustrates an illustration as in FIG. 1, but with a property of the fluid above the predefined property.

According to FIGS. 1, 2 (according to the invention) and 4 and 5, a fluid supply system 1, in particular of an internal combustion engine 2, for example a lubricant supply system and in particular an oil supply system 3, has a component 5 and a bypass 4 bypassing this. The component 5 can be configured for example as a cooler, a gear or a filter device. According to FIGS. 1, 2, 4 and 5, only the fluid channel 21 to the component 5 and the bypass channel 22 to the bypass 4 are shown here, so that the actual component 5 is situated below the illustrated image plane. In a control channel 6 a first bypass valve 7 with a valve body 8 is arranged here, which is adjustable between a first position (cf. FIG. 1) and a second position (cf. FIGS. 2, 4 and 5), and which in the first position blocks off the fluid channel 21 to the component 5, and in the second position blocks off the bypass channel 22, or vice versa. The control channel 6 leads here indirectly via a fluid pump, which is not shown, to a fluid reservoir 9. In FIG. 1 the valve body 8 is arranged above in the first position, whereas in FIGS. 4 and 5 it is arranged below in the first position, and vice versa. For this reason, in FIGS. 1, 2 and 4 and 5 a spring element 13 is embodied here as a compression spring.

Observing the control channel 6 more closely, it can be seen that the valve body 8 divides the control channel 6 into a first space 10 and a second space 11 and, at the same time, has a leakage opening 12 which connects the first space 10 with the second space 11. In the second space 11, furthermore, the spring element 13 is arranged, which prestresses the valve body 8 into its second position illustrated according to FIGS. 2, 4 and 5. The second space 11 is, furthermore, connected to the fluid reservoir 9 via a leakage channel 14, wherein in the leakage channel 14 a valve 15, in particular a solenoid valve, is arranged for at least partially opening/closing the leakage channel 14. According to FIGS. 1, 4 and 5, the valve 15 is shown here in its open position, in which the second space 11 is connected via the leakage channel 14 with the fluid reservoir 9, which is pressureless. By comparison, FIG. 2 shows the valve 15 in its closed position. Generally here, the valve 15 can have a solenoid valve, an electric switch, a bimetal and/or an expansion element 23. Particularly the embodiment as a solenoid valve, as a bimetal or as an electric switch enables a comparatively rapid switching and thereby a rapid reaction.

Furthermore, the fluid supply system 1 according to the invention has a sensing device 16, for example a temperature sensing device with a temperature sensor, which detects a property, in particular the temperature, of the fluid 17, for example oil or lubricant, and conveys it to a controlling device 18, which in turn is configured in such a manner that it closes the valve 15 on reaching of a predefined property, for example a predefined temperature T, and thereby blocks the leakage channel 14. For this purpose, the controlling device 18 is of course also connected to the valve 15. The sensing device 16 and the controlling device 18 can of course also be combined here in an expansion element 23.

In FIGS. 1 and 2, the sensing device 16 is configured as a temperature sensing device and consequently detects the temperature of the fluid 17. The predefined temperature T can lie here for example at $\geq 117°$ C., so that according to FIG. 1 a state of the fluid supply system 1 according to the invention is shown at a temperature T<117° C., and according to FIG. 2 at a temperature T$\geq$117° C.

Figure 3:
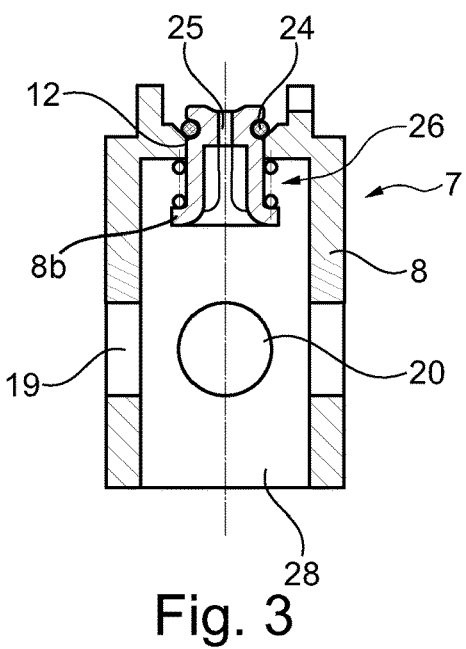
FIG. 3 illustrates a detail illustration of the second bypass valve according to FIGS. 1 and 2.

Observing the valve body 8 according to FIGS. 1 to 3 more closely, it can be seen that the latter is configured as a valve piston which has a shell-side first opening 19 and a shell-side second opening 20, wherein according to the switching position of the valve body 8, the first opening 19 is aligned with the bypass channel 22 to the bypass 4, or the second opening 20 is aligned with the fluid channel 21 to the component 5. The openings 19, 20 are arranged around the centre axis of the valve body 8 at the same height. On displacement of the valve piston, the openings 19, 20 travel, so that they either free the channel 21 or 22. In the case of the valve body 8 according to FIGS. 4 and 5, the valve body 8 has only one shell-side opening 19. The leakage opening 12 is arranged here in a base of the valve body 8. The valve piston itself can be made from metal or from plastic, wherein the construction from metal offers a particularly high resistance with respect to all fluids 17, whereas an embodiment from plastic can be produced at a comparatively favourable cost.

The fluid supply system 1 according to the invention functions here, with a sensing device 16 configured as a temperature sensing device, as follows:

At a temperature T<117° C. the situation illustrated according to FIG. 1 occurs, in which the temperature sensing device 16 detects the temperature, passes it on to the controlling device 18 and the latter thereupon keeps the valve 15 open. The fluid 17 flowing into the control channel 6 therefore generates a pressure $P_1$ in the first space 10, wherein it can flow via the throttle opening 25 into the second space 11 and via the latter and the opened leakage channel 14 into the fluid reservoir 9. The second bypass valve 26 only opens at particular operating states and frees the leakage opening 12. The fluid reservoir 9 is usually pressureless here, wherein, however, a valve body 8a of the valve 15 can be configured for example as a throttle, so that in the second space 11 the ambient pressure does not occur, but rather merely a pressure $P_2$ which is reduced with regard to the pressure $P_1$ prevailing in the first space 10. Between the first space 10 and the second space 11 therefore a pressure difference $\Delta P$ occurs, which counteracts the elastic force of the spring element 13. The force $F_1$ acting from below onto the valve body 9 in the present case is measured here at $$F_1 = P \cdot A_{(valve\ body)} - \Delta P \cdot A_{(valve\ body)}$$

whereas the force $F_2$ acting from above onto the valve body 8 is measured as follows:

$$F_2 = \Delta P \cdot A_{(valve\ body)} + F_{spring}$$

and wherein $$F_1 > F_2.$$

Hereby, the valve body 8 moves upwards, until the first shell-side opening 19 is aligned with the bypass channel 22 leading to the filter device 4 and the fluid 17 can flow into the bypass 4. A small leakage flow of the fluid 17 can also arrive via the throttle opening 25 into the second space 11 and via the leakage channel 14 into the fluid reservoir 9.

On reaching the predefined temperature T of ≥117° C., the first bypass valve 7 switches comparatively quickly into the position illustrated according to FIG. 2, because on reaching the predefined temperature T the controlling device 18 conveys a corresponding signal to the valve 15 and the latter thereupon transfers the valve body 8a into its closed position and quickly blocks the leakage channel 14. As the leakage channel 14 has a distinctly reduced cross-section compared to the control channel 6, here also a valve 15 can be used having only a small valve stroke but, at the same time, switching quickly. After the closing of the valve 15, the pressure $P_2$ in the second space 11 rises to the pressure $P_1$ in the first space 10, from which a $\Delta P$ of zero results. In this case, therefore, no more pressure-dependent adjustment of the valve body 8 of the first bypass valve 7 occurs at all, because the force $F_1$ acting from below onto the valve body 8 in a pressure-caused manner corresponds to the exclusively pressure-caused force F from above onto the valve body 8. Nevertheless, of course, the force $F_2$ acting from above onto the valve body 8 is greater than the force $F_1$, because from above in addition also the force $F_{(spring)}$ of the spring element 13 acts on the valve body 8. Therefore, the following applies for the state illustrated according to FIG. 2:

$$F_2 > F_1 \text{ with}$$

$$F_2 = P \cdot A_{(valve\ body)} + F_{spring}; \text{ and } F_1 = P \cdot A_{(valve\ body)}$$

With the first bypass valve 7 according to the invention and the fluid supply system 1 according to the invention, a controlling of the valve body 8 of the first bypass valve 7 is possible via the elastic force $F_{spring}$ via the fluid pressure $P_1$, $P_2$ and via the position of the valve body 8a of the valve 15. Depending on whether the valve 15 is open or closed, via a targeted configuration of the elastic force $F_{(spring)}$ of the spring element 13, the valve body 8 can open or respectively close the bypass channel 22 to the bypass 4.

Observing the fluid supply system 1 according to FIGS. 1 to 3, it can be seen that the second bypass valve 26 is arranged at/in the leakage opening 12 of the valve body 8. The second bypass valve 26 has, in addition, a spring-loaded valve body 8b, which is arranged in the leakage opening 12 and is prestressed with a sealing element 24 tightly against the leakage opening 12. The valve body 8b of the second bypass valve 26 has a throttle opening 25, which is smaller than the leakage opening 12. Hereby, in particular a rapid draining of the fluid 17 from the space 11 after the stoppage of the internal combustion engine 2 can be prevented.

Figure 4:
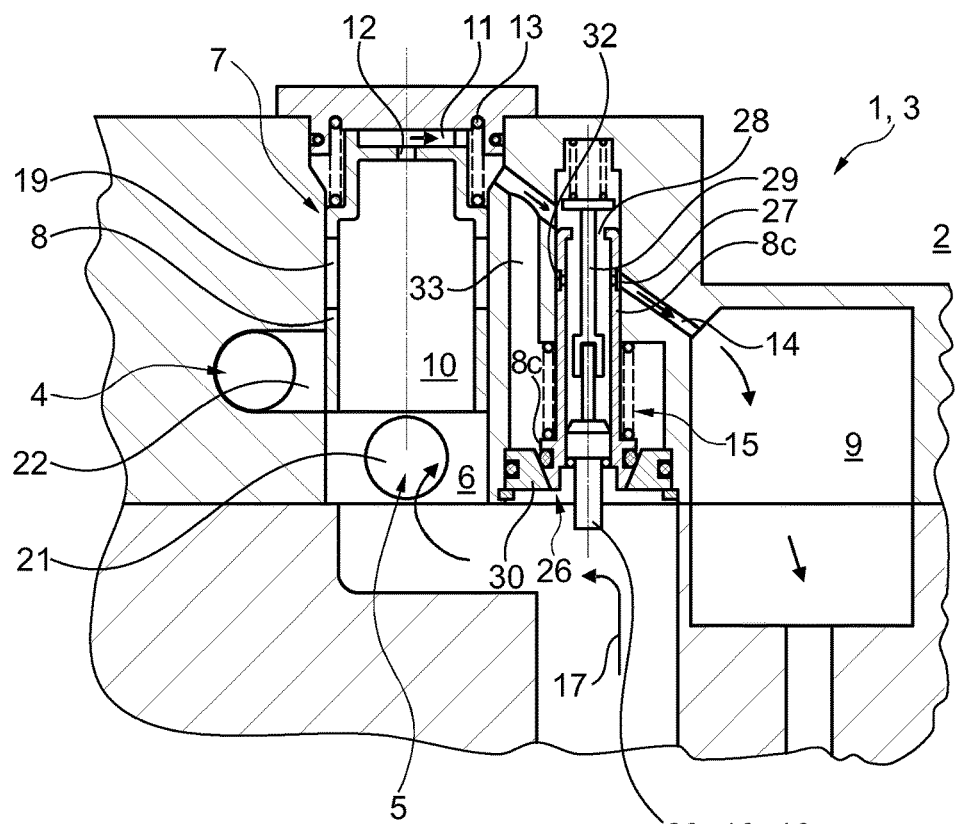
FIG. 4 illustrates an embodiment having a second bypass valve not arranged on the valve body of the first bypass valve.
Figure 5:
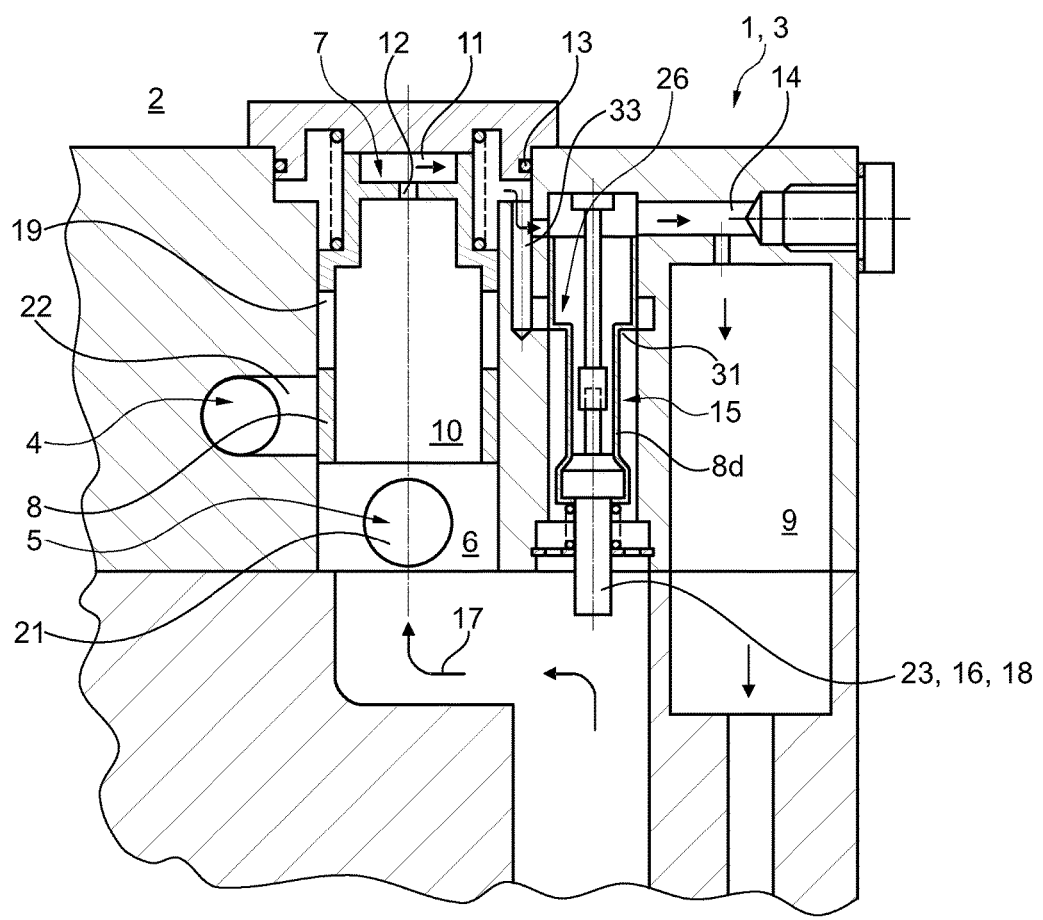
FIG. 5 illustrates an alternative embodiment to FIG. 4.

Observing the fluid supply system 1 according to FIGS. 4 and 5, it can be seen that the second bypass valve 26 is arranged in the region of the valve 15. Here, the second bypass valve 26 according to FIG. 4 has a spring-prestressed cylinder-like valve body 8c, which has a circumferential annular groove 27 in which the oil can flow around the valve body 8c and can flow into the leakage channel 14 to the fluid reservoir 9. Furthermore, the valve body 8c also has in addition an opening 32 arranged in the annular groove 27, which penetrates the valve body 8c, and a face-side opening 28.

In the embodiments of the valve 15 according to FIGS. 4 and 5, the second bypass valve 26 has an expansion element 23 and, according to FIG. 4, a plunger 29 coupled therewith, which on exceeding of a predefined property of the fluid 17 closes the face-side opening 28 and thereby blocks the leakage channel 14, which in this case runs through the valve body 8c.

The spring-prestressed cylinder-like valve body 8c is prestressed against a valve seat 30 and is configured such that it rises from the valve seat 30 in a pressure-dependent manner and thereby opens the second bypass valve 26.

In the case of the bypass valve 26 according to FIG. 5, this has a spring-prestressed cylinder-like valve body 8d with an annular shoulder 31 and is configured such that it frees, in a pressure-dependent manner, a balancing channel 33 connecting the second space 11 with the control channel 6, and thereby opens the second bypass valve 26.

Irrespective of the respectively selected embodiment of the second bypass valve 26, this makes possible, on a renewed starting of the internal combustion engine 2 with, at the same time an empty space 11, a rapid filling thereof and thereby a rapid proper operation.

In so far as the valve 15 is constructed as a solenoid valve or as an electrically switchable valve, it can of course be configured such that it fulfils a so-called failsafe function, i.e. it must be supplied with current in order to be transferred into the (open) state illustrated in FIG. 1. The valve 15 remains currentless in the closed state, so that the fluid 17 or respectively the oil is always directed via the component 5, and damage can be prevented.

The predefined temperature T=117° C. illustrated in FIGS. 1 and 2 of course only represents a possible temperature which applies for example for oil as fluid 17. Other parameters can of course also serve as detection value.

With the fluid supply system 1 according to the invention, therefore, a comparatively rapid switching of the first bypass valve 7 is possible, without an actuating device having a comparatively large valve stroke being necessary for this, because the valve stroke of the valve 15 for controlling the valve body 8 in the leakage channel 14 is entirely sufficient in order to influence the pressure conditions $P_1$, $P_2$ and thereby to control the first bypass valve 7.

The invention claimed is:

1. A fluid supply system with a component, the fluid supply system comprising:

a first bypass valve arranged in a control channel with a valve body adjustable at least between a first and a second position,
wherein the valve body separates the control channel into a first and a second space and has a leakage opening connecting the first space to the second space,
wherein the second space is connected to a fluid reservoir via a leakage channel,
a switchable valve arranged in the leakage channel and wherein the switchable valve is configured to at least partially open the leakage channel and at least partially close the leakage channel,
a sensing device configured to sense a property of the fluid and convey the property to a controlling device, wherein the controlling device is configured to close the valve to block the leakage channel when a predefined property is reached,
a second bypass valve configured to reduce a transient oscillation of the first bypass valve during a starting of the system,
wherein the second bypass valve is arranged in the leakage opening of the valve body,
wherein the second bypass valve has a spring-loaded valve body arranged in the leakage opening,
wherein the spring-loaded valve body is prestressed with a sealing element tightly against an edge of the leakage opening, and
wherein the spring-loaded valve body has a throttle opening smaller than the leakage opening.

2. The fluid supply system according to claim 1, wherein the sensing device is configured as a temperature sensing device and the controlling device is configured to close the valve on reaching a temperature (T) of T>117° C.

3. The fluid supply system according to claim 1, wherein the component is configured as one of a cooler, a gear, and a filter device.

4. The fluid supply system according to claim 1, wherein the fluid supply system is configured as a lubricant supply system.

5. The fluid supply system according to claim 1, wherein the fluid supply system has a fluid channel formed therein; and
wherein the fluid supply system has a bypass channel formed therein.

6. The fluid supply system according to claim 5, wherein the valve body has a shell-side first opening formed therein; and
wherein the valve body has a shell-side second opening formed therein.

7. The fluid supply system according to claim 6, wherein the shell-side first opening is aligned with the bypass channel when the valve body is positioned in the first position.

8. The fluid supply system according to claim 7, wherein the shell-side first opening is configured to block passage of the fluid from the first space into the fluid channel when the valve body is positioned in the first position.

9. The fluid supply system according to claim 7, wherein the shell-side second opening is aligned with the fluid channel when the valve body is positioned in the second position.

10. The fluid supply system according to claim 9, wherein the shell-side second opening is configured to block passage of the fluid from the first space into the bypass channel when the valve body is positioned in the second position.

11. An internal combustion engine with a fluid supply system having a component, the fluid supply system comprising:
a first bypass valve arranged in a control channel with a valve body adjustable at least between a first and a second position,
wherein the valve body separates the control channel into a first and a second space and has a leakage opening connecting the first space to the second space,
wherein the second space is connected to a fluid reservoir via a leakage channel,
a switchable valve arranged in the leakage channel and wherein the switchable valve is configured to at least partially open the leakage channel and at least partially close the leakage channel,
a sensing device configured to sense a property of the fluid and convey the property to a controlling device, wherein the controlling device is configured to close the valve to block the leakage channel when a predefined property is reached,
a second bypass valve configured to reduce a transient oscillation of the first bypass valve during a starting of the system,
wherein the second bypass valve is arranged in the leakage opening of the valve body,
wherein the second bypass valve has a spring-loaded valve body arranged in the leakage opening,
wherein the spring-loaded valve body is prestressed with a sealing element tightly against an edge of the leakage opening, and
wherein the spring-loaded valve body has a throttle opening smaller than the leakage opening.

12. The fluid supply system according to claim 11, wherein the sensing device is configured as a temperature sensing device and the controlling device is configured to close the valve on reaching a temperature (T) of T>117° C.

13. The fluid supply system according to claim 11, wherein the component is configured as one of a cooler, a gear, and a filter device.

14. The fluid supply system according to claim 11, wherein the fluid supply system is configured as a lubricant supply system.

15. The internal combustion engine according to claim 11, wherein the fluid supply system has a fluid channel formed therein; and
wherein the fluid supply system has a bypass channel formed therein.

16. The internal combustion engine according to claim 15, wherein the valve body has a first opening formed therein; and
wherein the valve body has a second opening formed therein.

17. The internal combustion engine according to claim 16, wherein the first opening is aligned with the bypass channel when the valve body is positioned in the first position.

18. The internal combustion engine according to claim 17, wherein the first opening is configured to block passage of the fluid from the first space into the fluid channel when the valve body is positioned in the first position.

19. The internal combustion engine according to claim 17, wherein the second opening is aligned with the fluid channel when the valve body is positioned in the second position.

20. The internal combustion engine according to claim 19, wherein the second opening is configured to block passage of the fluid from the first space into the bypass channel when the valve body is positioned in the second position.

* * * * *